United States Patent [19]

Suzuki et al.

[11] 4,447,142
[45] May 8, 1984

[54] BLADE TYPE FOCAL PLANE SHUTTER

[75] Inventors: Akira Suzuki, Tokyo; Katumi Kaneko, Ageo; Nobuyoshi Inoue, Kawagoe, all of Japan

[73] Assignee: Copal Company Limited, Tokyo, Japan

[21] Appl. No.: 416,375

[22] Filed: Sep. 9, 1982

[30] Foreign Application Priority Data

Sep. 10, 1981 [JP] Japan ............................ 56-141706

[51] Int. Cl.³ .................... G03B 9/36; G03B 19/12
[52] U.S. Cl. ................................. 354/246; 354/152
[58] Field of Search ............. 354/152, 153, 245, 246, 354/247, 248, 249

[56] References Cited

U.S. PATENT DOCUMENTS

| 3,903,539 | 9/1975 | Kitai et al. | 354/245 |
| 4,096,505 | 6/1978 | Onda et al. | 354/249 |
| 4,114,174 | 9/1978 | Onda et al. | 354/249 |
| 4,145,132 | 3/1979 | Onda et al. | 354/249 |
| 4,313,658 | 2/1982 | Sugiura et al. | 354/246 |

Primary Examiner—A. A. Mathews
Attorney, Agent, or Firm—Cushman, Darby & Cushman

[57] ABSTRACT

A blade type focal plane shutter wherein an exposure aperture is made to be always covered with a front blade group and rear blade group in a mirror-down state by operatively connecting a quick return mirror and a blade opening and closing controlling mechanism with each other in order to obtain a high light shielding property with the front blade group and rear blade group except when an exposure is made.

2 Claims, 8 Drawing Figures

BLADE TYPE FOCAL PLANE SHUTTER

BACKGROUND OF THE INVENTION (a) Field of the Invention

This invention relates to focal plane shutters and more particularly to a blade type focal plane shutter wherein, except when an exposure is made, an exposure aperture will be covered with a front blade group and rear blade group, when the shutter is released, first the rear blade group will be moved to a folded position opening the exposure aperture and then the front blade group will be moved to a folded position opening the exposure aperture to begin an exposure and, when a proper exposure time has passed, the rear blade group will be moved to an unfolded position covering the exposure aperture to end the exposure.

(b) Description of the Prior Art

Generally, in a blade type focal plane shutter, in order to reduce the cocking force or increase the moving velocities of the blades themselves at the time of an exposure, it is effective to reduce the size of each shutter blade. However, then, there will be a problem that the overlapping amount of the respective blades forming the front blade group or rear blade group in case the front blade group or rear blade group is in the unfolded position covering the exposure aperture will be so small that, as a result, the likelihood of a light leakage will increase. Therefore, there is suggested such type as is disclosed, for example, in U.S. Pat. No. 4,114,174 wherein, a rear blade group is moved to an unfolded position covering an exposure aperture to end an exposure and then a front blade group is again moved to the unfolded position covering the exposure aperture to cover the exposure aperture with the front blade group and rear blade group, this state is maintained even after the shutter is cocked and, when the shutter is released, first the rear blade group will open the exposure aperture and then the front blade group will open the exposure aperture to begin an exposure. However, such known one has defects that the mechanism is complicated and the manufacturing cost is high.

SUMMARY OF THE INVENTION

A primary object of the present invention is to provide a blade type focal plane shutter of the first described type wherein a sufficient performance can be developed in spite of a simple mechanism.

According to the present invention, this object is attained by forming a shutter mechanism so that, as soon as a rear blade group is brought to a folded position not covering an exposure aperture in interlocking with the up-operation of a quick return mirror by a camera release, a rear blade driving spring will be tensioned and, as soon as a front blade group is brought to an unfolded position covering the exposure aperture in interlocking with the down-operation of the above mentioned mirror after the end of the exposure, a front blade driving spring will be tensioned.

According to a preferred formation of the present invention, a shutter mechanism is so formed that a front blade group and rear blade group will always cover an exposure aperture when a mirror is in the down-position, the shutter can be cocked independently of the operation of winding up the film, a front blade driving spring will be tensioned in case the front blade group is brought to a position covering the exposure aperture and a rear blade driving spring will be tensioned in case the rear blade group is brought to a position not covering the exposure aperture, therefore a high light shielding performance can be obtained though the structure is comparatively simple and the same function as of the conventional blade type focal plane shutter can be developed.

This and other objects of the present invention will become more apparent during the course of the following detailed description and appended claims.

DESCRIPTION OF THE PREFERRED EMBODIMENT

Figure 1:
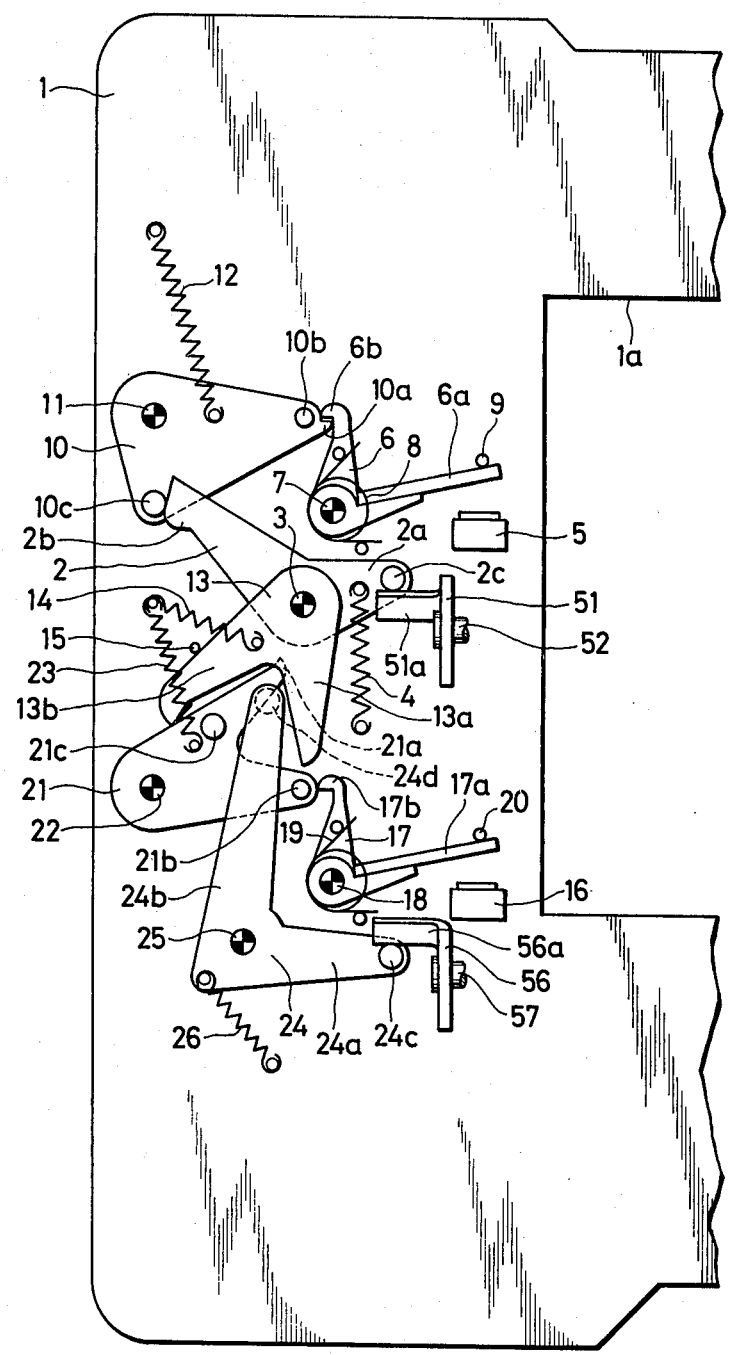
FIG. 1 is a schematic plan view of a shutter blade opening and closing mechanism part of a focal plane shutter according to the present invention.
Figure 6:
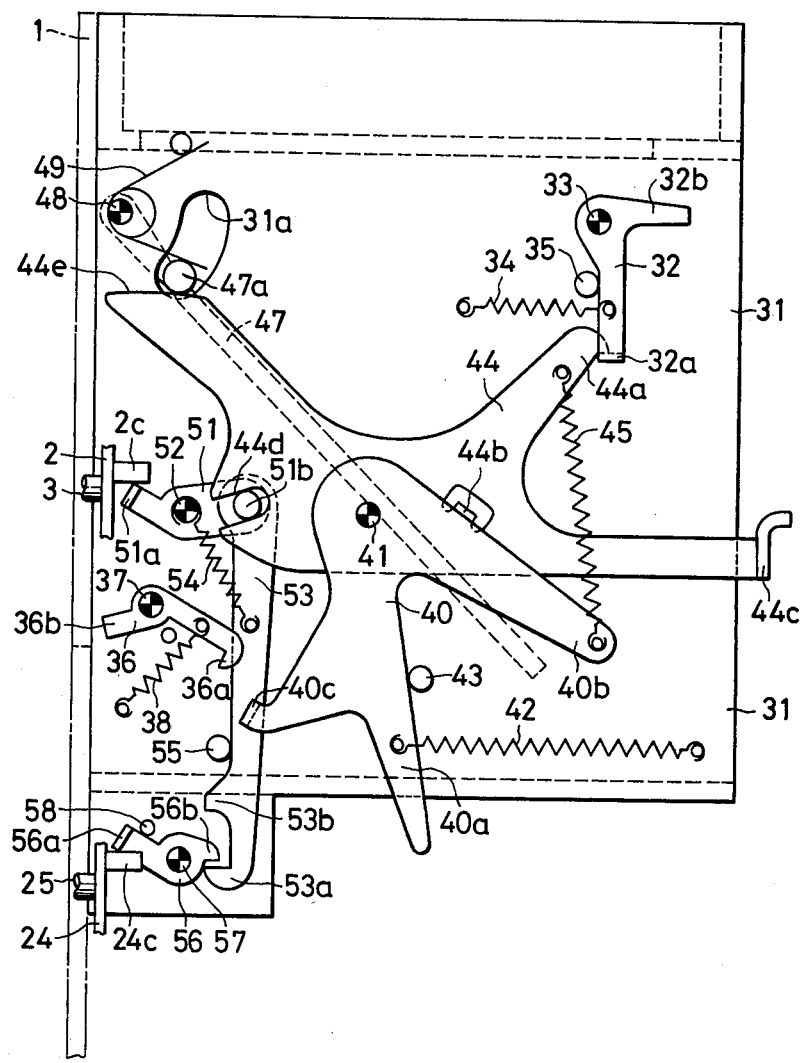
FIG. 6 is a side view of a mirror driving mechanism corresponding to the state shown in FIG. 1 and its related mechanism part.

FIG. 1 is a schematic plan view of a shutter blade opening and closing mechanism part of a focal plane shutter embodying the present invention, showing the mirror-down state after the end of an exposure. FIG. 6 is a left side view of a mirror box of a camera. This mirror box is arranged on a base plate of the focal plane shutter in FIG. 1. The state of the mechanism shown in FIG. 6 corresponds to the state in FIG. 1.

In FIG. 1, the reference numeral 1 denotes a base plate in which an exposure aperture 1a is formed and 2 denotes a front blade cocking lever forming arm parts 2a and 2b, provided with a pin 2c on the arm part 2a, rotatably supported by a shaft 3 fixed to the base plate 1 and clockwise biased by a spring 4. The pin 2c is engaged with a bent part 51a of a later described interlocking lever 51 by the resilient force of the spring 4. The reference numeral 5 denotes an electromagnetic device secured to the base plate 1, 6 denotes a front blade locking lever forming an armature part 6a and hook part 6b, rotatably supported by a shaft 7 fixed to the base plate 1 and counterclockwise biased by a spring 8 but prevented from the counterclockwise rotation by the engagement of the armature part 6a with a stopper pin 9, and 10 denotes a front blade driving lever forming a hook part 10a engageable with the hook part 6b of the front blade locking lever 6, provided with a blade driving pin 10b and cocking pin 10c, provided to a shaft 11 fixed to the base plate 1 and counterclockwise biased by a front blade driving spring 12 but prevented from the counterclockwise rotation by the engagement of the cocking pin 10c with the arm part 2b of the front blade cocking lever 2. The blade driving pin 10b is connected with a front blade group not illustrated by a well known means. In the state shown in FIG. 1, the front blade group is unfolded so as to cover the exposure aperture 1a. The reference numeral 13 denotes a rear blade cocking lever forming arm parts 13a and 13b, pivoted to the above mentioned shaft 3 and clockwise biased by a spring 14 but prevented from the clockwise rotation by the engagement with a stopper pin 15, 16 denotes an electromagnetic device secured to the base plate 1, 17 denotes a rear blade locking lever forming an armature part 17a and hook part 17b, pivoted to a shaft 18 fixed to the base plate 1 and counterclockwise biased by a spring 19 but prevented from the counterclockwise rotation by the engagement of the armature part 17a with a stopper pin 20, and 21 denotes a rear blade driving lever forming a hook part 21a engageable with the hook part 17b of the rear blade locking lever 17, provided with a blade driving pin 21b and cocking pin 21c, pivoted to a shaft 22 fixed to the base plate 1 and counterclockwise biased by a rear blade driving spring 23 but prevented from the counterclockwise rotation by a stopper pin not illustrated. The blade driving pin 21b is connected with the rear blade group not illustrated by a well known means. In the state shown in FIG. 1, the rear blade group is unfolded so as to cover the exposure aperture 1a. The reference numeral 24 denotes a cocking lever forming arm parts 24a and 24b, provided with a pin 24c on the arm part 24a and a pin 24d on the arm part 24b, pivoted to a shaft 25 fixed to the base plate 1 and counterclockwise biased by a spring 26. The pin 24c is engaged with a bent part 56a of a later described interlocking lever 56 by the spring 26. Further, in FIG. 6, the reference numeral 31 denotes a mirror box side plate in which an escape slot 31a is formed, 32 denotes a first locking lever forming a bent part 32a and arm part 32b, pivoted to a shaft 33 fixed to the side plate 31 and clockwise biased by a spring 34 but prevented from the clockwise rotation by a stopper pin 35 and controlled by the shutter releasing operation. The reference numeral 36 denotes a second locking lever forming a hoot part 36a and arm part 36b, pivoted to a shaft 37 fixed to the side plate 31 and clockwise biased by a spring 38 but prevented from the clockwise rotation by pushing down the arm part 36b with a member not illustrated and controlled in interlocking with the operation of the rear blade group. The reference numeral 40 denotes a cocking lever forming arm parts 40a and 40b and a bent part 40c, pivoted to a shaft 41 fixed to the side plate 31 and counterclockwise biased by a spring 42 but prevented from the counterclockwise rotation by the engagement of the arm part 40a with a stopper pin 43, 44 denotes a controlling lever forming a hook part 44a, bent parts 44b and 44c a fork part 44d and a face 44e, pivoted to a shaft 41 and clockwise biased by a spring 45 but prevented from the clockwise rotation by the engagement of the bent part 44b with the above mentioned arm part 40b, and 47 denotes a mirror provided with a pin 47a, pivoted to a shaft 48 fixed to the side plate 31 and clockwise biased by a spring 49 but prevented from the clockwise rotation by the engagement of the pin 47a with the above mentioned face 44e. In the state in FIG. 6 (corresponding to the state in FIG. 1), the mirror 47 is in the down-position, reflects a photographing light arriving through a photographing lens not shown and leads it to a finder not shown. The reference numeral 51 denotes the interlocking lever forming the bent part 51a, provided with a pin 51b and pivoted to a shaft 52 fixed to the side plate 31. The pin 51b fits in the fork part 44d and is reciprocally rotated in interlocking with the rotation of the controlling lever 44. In FIG. 6, the interconnecting lever 51 is clockwise rotated and the bent part 51a pushes the pin 2c of the front blade cocking lever 2 to prevent the front blade cocking lever 2 from returning clockwise. The reference numeral 53 denotes an auxiliary interlocking lever forming a hook part 53a and projecting part 53b, pivoted to the pin 51b of the interlocking lever 51 and clockwise biased by a spring 54 but prevented from the clockwise rotation by the engagement with a pin 55 fixed to the side plate 31, and 56 denotes the interlocking lever forming the bent part 56a and a hook part 56b, pivoted to a shaft 57 fixed to the side plate 31 and pushed clockwise by the pin 24c of the above mentioned cocking lever 24 but prevented from the clockwise rotation by a stopper pin 58.

Figure 7:
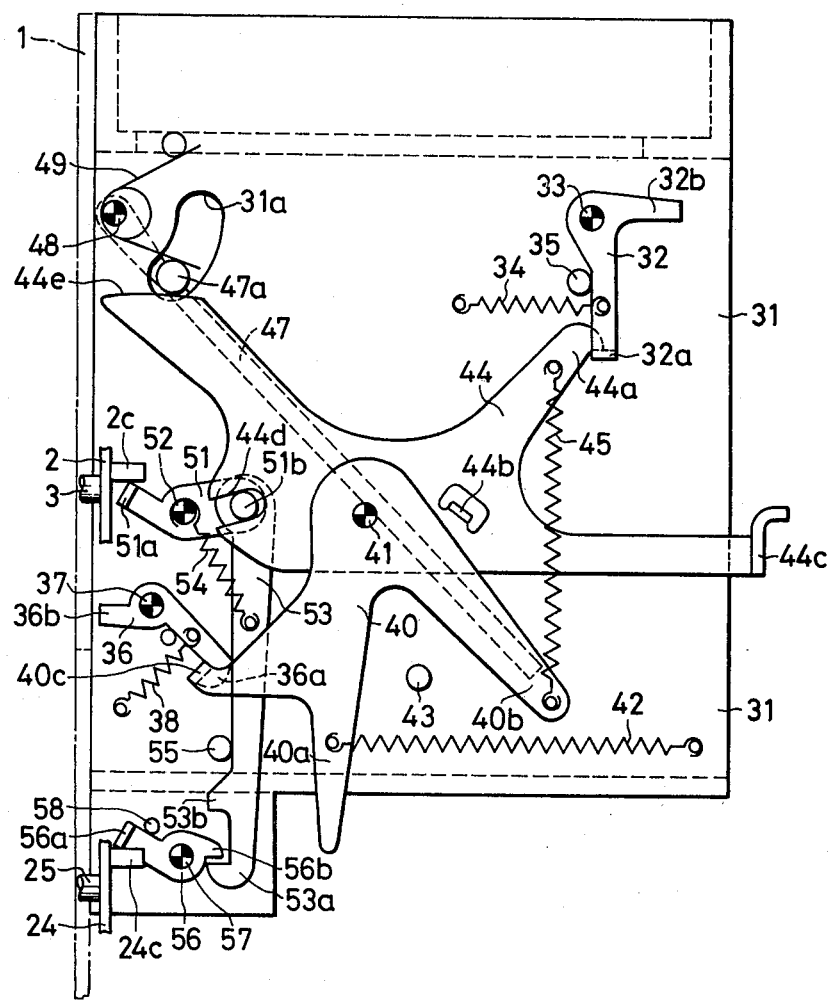
FIG. 7 is a side view of a mirror driving mechanism showing an operating state different from FIG. 6 and its related mechanism part.

The shutter according to the present invention formed as in the above operates as follows:

First of all, when the cocking lever 40 is rotated clockwise from the position shown in FIG. 6 in interlocking with the operation of winding up the film, the springs 42 and 45 will be tensioned, the cocking lever 40 will be prevented by the engagement of its bent part 40c with the hook part 36a of the second locking lever 36 and the mirror will be in the cocked state (See FIG. 7). At this time, both of the front blade group and rear blade group will cover the exposure aperture 1a.

Figure 8:
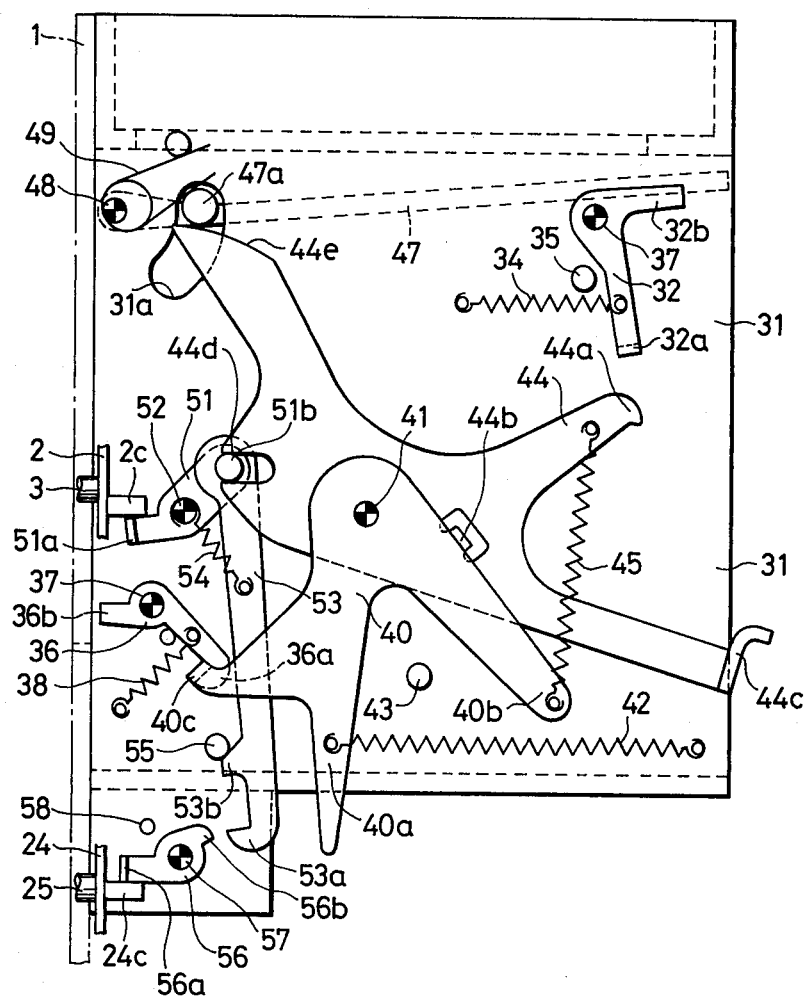
FIG. 8 is a side view of a mirror driving mechanism corresponding to the state shown in FIG. 2 and its related machanism part.

Then, when the shutter releasing button not illustrated is pushed, the first locking lever 32 will be rotated counterclockwise against the force of the spring 34 and therefore its bent part 32a will be disengaged with the hook part 44a of the controlling lever 44. Therefore, the controlling lever 44 will be rotated clockwise by the returning force of the tensioned spring 45, the face 44e will push up the pin 47a of the mirror 47 and therefore the mirror 47 will be rotated counterclockwise and will be brought to the up-position. Also, the pin 51b of the interlocking lever 51 will follow the displacement of the fork part 44d together with the clockwise rotation of the controlling lever 44 and therefore the interlocking lever 51 will be rotated counterclockwise. At this time, the auxiliary interlocking lever 53 will move upward while contacting with the pin 55 by the tension of the spring 54, therefore the hook part 56b of the interlocking lever 56 will be pushed up by the hook part 53a and the interlocking lever 56 will be rotated counterclockwise but, when the projecting part 53b of the auxiliary interlocking lever 53 engages with the pin 55, the projecting part 53b will be pushed by the pin 55, the auxiliary interlocking lever 53 will be rotated counterclockwise and the hook parts 53a and 56b will be disengaged from each other. Also, the bent part 44c of the controlling lever 44 will be displaced in the same manner and an automatic diaphragm mechanism not illustrated will be controlled. When the bent part 44b then engages with the side of the arm part 40b, the controlling lever 44 will be prevented from rotating clockwise (See FIG. 8).

Figure 2:
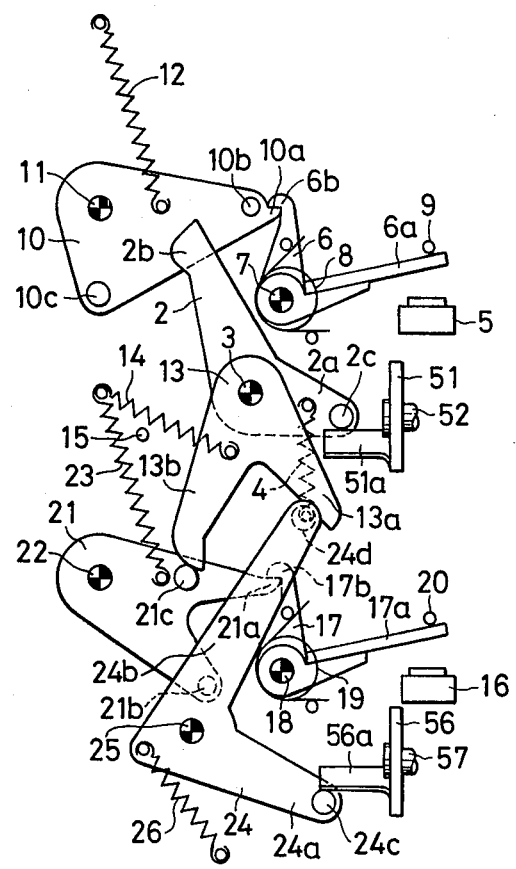
FIGS. 2 through 5 are explanatory views showing respectively different operating states of the shutter blade mechanism part shown in FIG. 1.

When the interlocking lever 51 rotates counterclockwise as described above, its bent part 51a will release the pressing against the pin 2c of the front blade cocking lever 2, therefore the front blade cocking lever 2 will be rotated clockwise by the returning force of the spring 4 and the cocking pin 10c of the front blade driving lever 10 will be unlocked with its arm part 2b. Therefore, the front blade driving lever 10 will rotate counterclockwise a little and its hook part 10a will engage with the hook part 6b of the front blade locking lever 6 and will be retained again in the position. Further, when the interlocking lever 56 is rotated counterclockwise as described above, its bent part 56a will push down the pin 24c of the cocking lever 24, therefore the cocking lever 24 will be rotated clockwise against the tension of the spring 26 and its pin 24d will push the arm part 13a of the rear blade cocking lever 13. Therefore, the rear blade cocking lever 13 will be rotated counterclockwise against the tension of the spring 14, its arm part 13b will push the pin 21c of the rear blade driving lever 21, therefore the rear blade driving lever 21 will be rotated clockwise against the tension of the rear blade driving spring 23 and its hook part 21a will pass over the hook part 17b and will engage with the hook part 17b (See FIG. 2). Here, FIG. 2 corresponds to FIG. 8 and only the front blade group covers the exposure aperture 1a but the rear blade group is brought to the folded position not covering the exposure aperture 1a.

Figure 3:
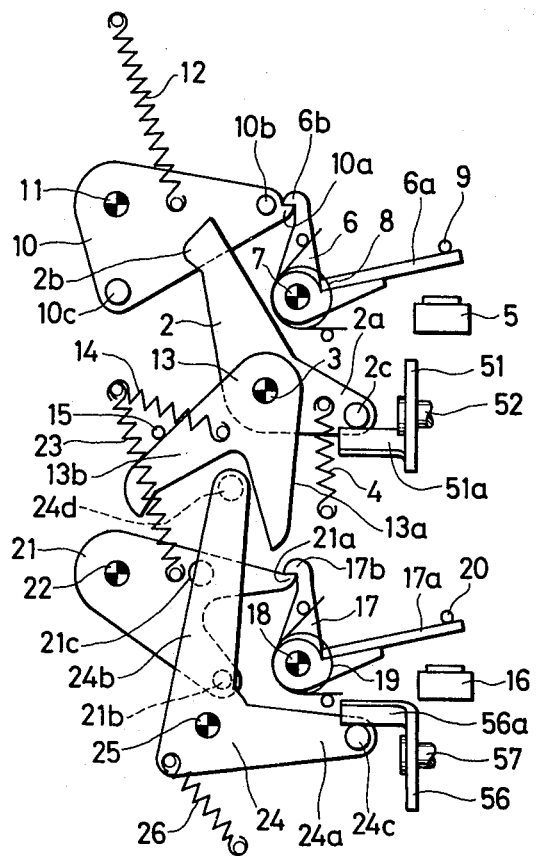

Further, when, at last in the displacement of the auxiliary interlocking lever 53, its hook part 53a is disengaged from the hook part 56b of the interlocking lever 56 as described above, the clockwise rotated cocking lever 24 will be rotated counterclockwise by the tension of the spring 26, its pin 24c will push up the bent part 56a of the interlocking lever 56 and therefore the interlocking lever 56 will rotate clockwise, will engage with the stopper pin 58 and will be prevented from rotating clockwise (See FIG. 3).

Figure 4:
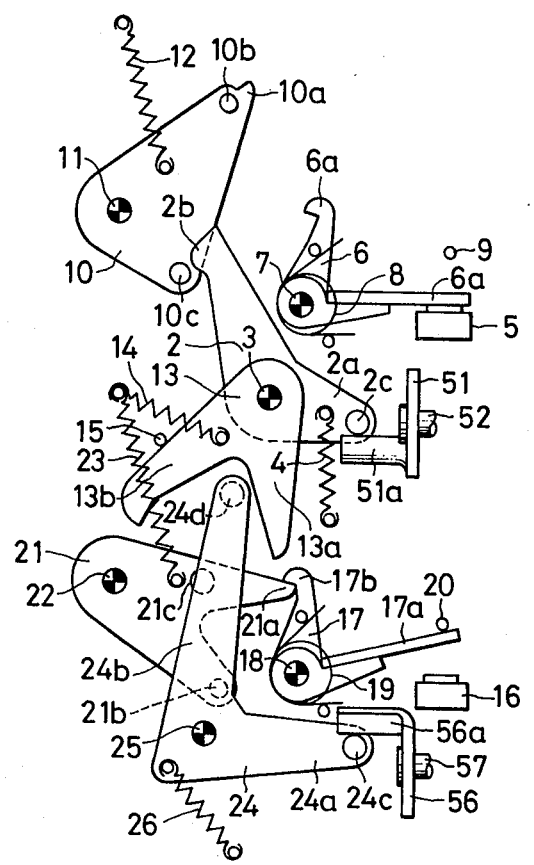
Figure 5:
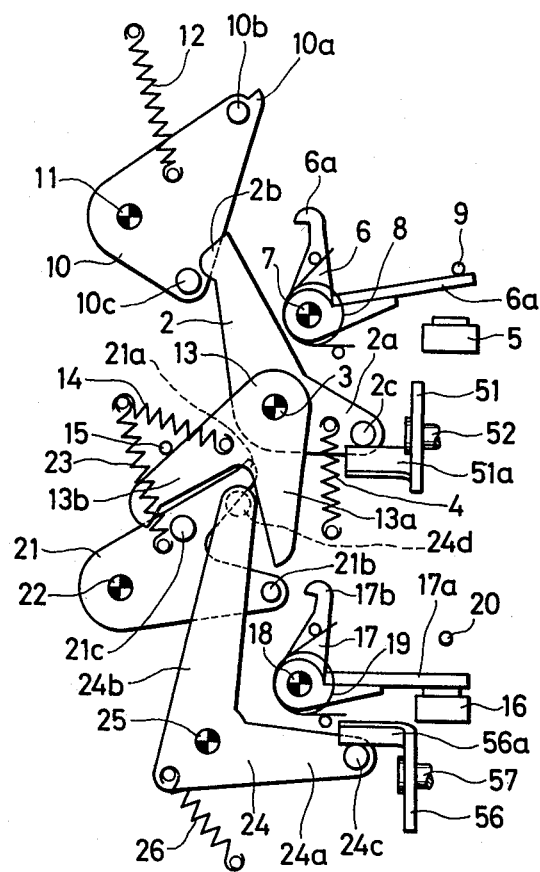

Then, when an electric current is passed through the electromagnetic device 5 by a well known means to excite it, the armature part 6a will be attracted by the electromagnetic device 5, the front blade locking lever 6 will be rotated clockwise and therefore its hook part 6b will be disengaged from the hook part 10a of the front blade driving lever 10. Therefore, the front lever driving lever 10 will be rotated counterclockwise by the returning force of the front blade driving spring 12 and will be prevented by the engagement with a stopper pin not illustrated. Thus, the front blade group will be folded above the exposure aperture 1a, that is, in the position not covering the exposure aperture 1a, the exposure aperture 1a will be opened and the exposure will be started. At this time, the rear blade group will be retained in the starting position (the folded position) (See FIG. 4). Then, when a proper exposure time has passed, an electric current will be passed through the electromagnetic device 16 by a well known means to excite it, the armature part 17a will be attracted by the electromagnetic device 16, the rear blade locking lever 17 will be rotated clockwise and therefore its hook part 17b will be disengaged from the hook part 21a of the rear blade driving lever 21. Therefore, the rear blade driving lever 21 will be rotated counterclockwise by the returning force of the rear blade driving spring 23 and will be prevented by the engagement with a stopper pin not illustrated. Thus, the rear blade group will be unfolded so as to cover the exposure aperture 1a to complete one exposure. At this time, the front blade group will leave the exposure aperture open (See FIG. 5). By the way, the passing of the electric current through the electromagnetic devices 5 and 16 is instantaneous, the electromagnetic devices 5 and 16 will be immediately demagnetized and therefore the front blade locking lever 6 and rear blade locking lever 17 will be returned to the position as of before the attraction respectively by the springs 8 and 19.

When the rear blade group closes the exposure aperture 1a as described above, the second locking lever 36 will be rotated counterclockwise as timed with it. This counterclockwise rotating motion will be usually operatively connected with the rear blade driving lever 21 in the final operating range of the rear blade driving lever 21. By this counterclockwise rotation of the second locking lever 36, its hook part 36a will be disengaged from the bent part 40c of the cocking lever 40 and therefore the cocking lever 40 will be rotated counterclockwise together with the controlling lever 44 by the returning force of the spring 42. Therefore, the mirror 47 will be rotated clockwise by the returning force of the spring 49 and will return to the down-position. On the other hand, with the counterclockwise rotation of the controlling lever 44, the interlocking lever 51 will be rotated clockwise, its bent part 51a will push the pin 2c of the front blade cocking lever 2 and therefore the front blade cocking lever 2 will be rotated counterclockwise,. With the counterclockwise rotation of the front blade cocking lever 2, its arm part 2b will push the pin 10c of the front blade driving lever 10, therefore the front blade driving lever 10 will be rotated clockwise against the tension of the spring 12, the spring 12 will be tensioned and the state in FIG. 1 will return. At this time, both of the front blade group and rear blade group will be unfolded so as to cover the exposure aperture 1a. Then, the counterclockwise rotation of the cocking lever 40 will be prevented by the stopper pin 43, the controlling lever 44 will be brought to a position in which the hook part 44a can engage with the bent part 32a of the first locking lever 32, the auxiliary interlocking lever 53 will be moved by the spring 54 to a position in which its hook part 53a can engage with the hook part 56b of the interlocking lever 56 and all the elements will return to the position in FIG. 6. Thus one exposing operation will all end.

As apparent from the above explanation, the focal plane shutter according to the present invention can be operatively connected directly with a mirror mechanism or automatic diaphragm mechanism.

We claim:
1. A blade type focal plane shutter comprising a front blade driving lever movable between its cocked position in which a front blade group is brought to an unfolded position covering an exposure aperture and its uncocked position in which said front blade group is brought to a folded position not covering said exposure aperture, a rear blade driving lever movable between its cocked position in which a rear blade group is brought to a folded position not covering said exposure aperture and its uncocked position in which said rear blade group is brought to an unfolded position covering said exposure aperture, a front blade cocking lever engageable with said front blade driving lever and capable of bringing said front blade driving lever to its cocked position from its uncocked position, a rear blade cocking lever capable of bringing said rear blade driving lever to its cocked position from its uncocked position, a first interlocking lever operatively connected to said front blade cocking lever in order to operate said front blade cocking lever, a second interlocking lever operatively connected to said rear blade cocking lever in order to operate said rear blade cocking lever, and means operatively connected respectively to said first and second interlocking levers and capable of bringing a mirror to the down-position and up-position, said rear blade driving lever being brought to its cocked position from its uncocked position through said second interlocking lever when said mirror is brought to the up-position from the down-position by said means, and said front blade driving lever being brought to its cocked position from its uncocked position through said first interlocking lever when said mirror is brought to the down-position from the up-position by said means.

2. A blade type focal plane shutter according to claim 1 wherein said means are operatively connected to an automatic diaphragm mechanism.

* * * * *